June 20, 1933.  D. W. BLAKESLEE  1,915,082
METHOD OF AND APPARATUS FOR ELECTRIC WELDING
Filed Dec. 10, 1930
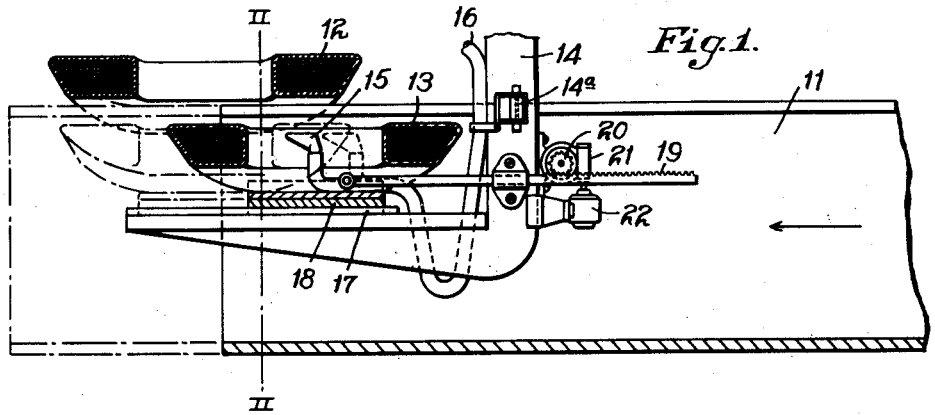
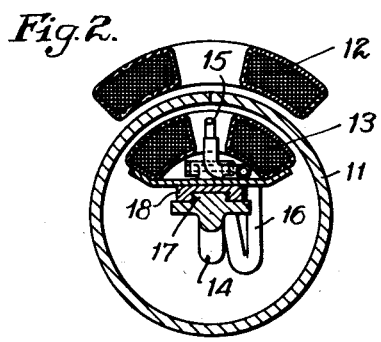
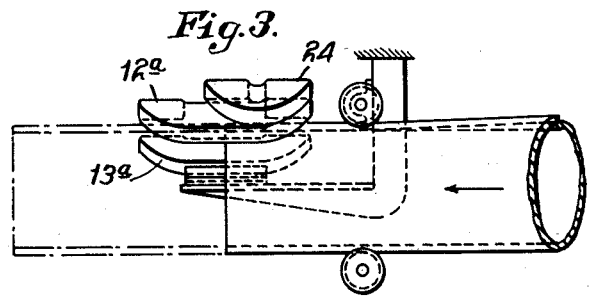
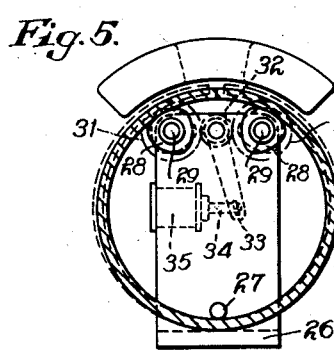
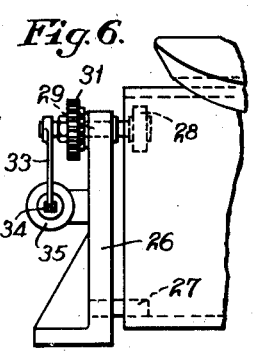
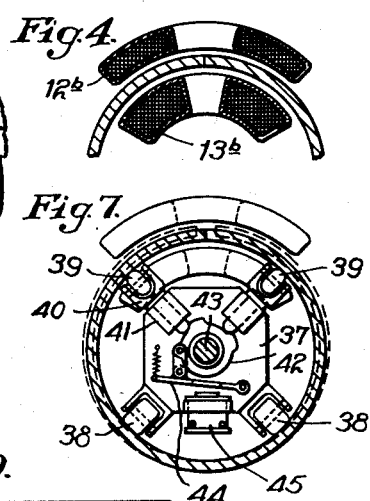
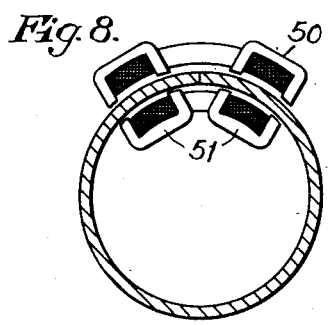
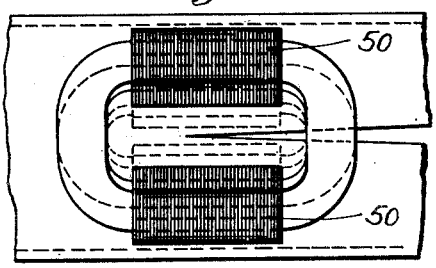
INVENTOR
Doral W. Blakeslee,
By Urchworth Martin,
Attorney.

Patented June 20, 1933

1,915,082

UNITED STATES PATENT OFFICE

DORAF W. BLAKESLEE, OF PITTSBURGH, PENNSYLVANIA

METHOD OF AND APPARATUS FOR ELECTRIC WELDING

Application filed December 10, 1930. Serial No. 501,298.

My invention relates to a method of and apparatus for electric welding, and more particularly to the welding together of edges of metal sheets, pipe welding, etc.

My invention is directed to the operation of welding by the use of alternating current induction, as distinguished from what is known as the resistance welding method, wherein an impressed voltage causes flow through the material by direct electrical contact.

One object of my invention is to provide a means and a method whereby an effective weld is secured in a generally improved and simplified manner.

Another object of my invention is to provide a means and a method to prevent the inclusion of impurities in the weld.

Another object of my invention is to provide an improved means for varying the intensity of the arc across the edges of the material in the induced current circuit flowing in the material operated upon, whereby the welding operation may be carried on at a substantially constant rate of speed throughout the length of the material being welded.

Still another object of my invention is to provide means for varying the angular gap between the edges of pipe skelp, or the like, during their approach to the welding point, to more readily control the arcing across said edges.

Still another object of my invention is to provide means for reducing the normal reluctance of the magnetic circuit in the welding of metal by alternating current induction.

Various means for the practice of my invention are shown in the accompanying drawing wherein Figure 1 is a longitudinal sectional view of welding apparatus showing a section of pipe skelp positioned for a welding operation; Fig. 2 is a view taken on the line II—II of Fig. 1; Fig. 3 is a view showing a modification of the apparatus of Fig. 1; Fig. 4 is a cross sectional view showing an arrangement of coils for effecting a blowing or magnetic repulsion of impurities from between the edges of a pipe being welded; Fig. 5 is a cross sectional view showing means for initially spreading the contacting edges of a pipe skelp in order to draw an arc therebetween; Fig. 6 is a side elevational view thereof; Fig. 7 shows a modification of the structure of Fig. 5; Fig. 8 is a cross sectional view showing means for reducing the reluctance of the magnetic circuit in inductive welding apparatus, and Fig. 9 is a plan view thereof.

Referring first to Figs. 1 and 2, I show a pipe blank or skelp 11 which is movable, in the direction indicated by the arrow, between coils 12 and 13 that are energized from a suitable source of alternating current to induce an electromotive force and current in the skelp, or other material being welded, to create an arc across the edges thereof, thereby effecting heating and softening of the metal to welding temperature, particularly at the edges of the skelp. The skelp is advanced between the coils by means of suitable feed rollers or guide means, such for example, as those shown in my copending application Serial No. 491,985, filed October 29, 1930. The edges of the skelp are forced into contact with one another, or permitted to spring into contact with each other by the inherent resiliency of the metal of the skelp, as set forth in my copending application.

A bracket 14 is suspended from a suitable support (not shown), between the edges of the skelp, and serves as a spreader bar for the skelp edges when the skelp is being advanced for a welding operation, rollers 14a being provided between the edges of the skelp and the bracket to prevent rapid wear of the spreader bar. The spreader bar 14 is so located relative to the coils 12 and 13 as to secure a desired angle of approach between the edges of the skelp. The angle of convergence is preferably located within the secondary circuit zone so that arcing between the edges of the skelp may be established in order to cause initial heating of the edges of the skelp. The induced current flowing in the skelp and arcing at the edges thereof will heat and soften the metal to welding temperatures to fuse the edges of the skelp together.

The bracket 14 serves as a support for the inner coil 13 and for an elongated and flattened air nozzle 15 which is supplied through a pipe 16 from a suitable source of air pressure.

In order to secure an adequate induced potential or electromotive force in the pipe at the forward extremity of the pipe, and immediately upon entering of the pipe skelp between the coils, the coils 12 and 13 at the beginning of the welding operation are offset from one another as shown in Fig. 1. The induced current circuit will be somewhat concentrated at the forward end of the pipe, as shown in its full-line position, so that an arc will be more readily established across the edges of the skelp in a manner hereinafter described.

After the arc is started, the coils can be brought into axial alinement with one another, if desired, to secure reduced reactance, increased power-factor, reduced thermal loss due to heat conduction, and to increase welding speed. At the other end of the pipe, one coil may be again shifted counter to the direction as shown in Fig. 1.

The change in relative positions of the coils 12 and 13 is effected by sliding the coil 13 on the horizontal arm of the bracket 14, which arm is provided with a slideway 17 upon which a slide 18 which carries the coil 13 is mounted. The slide 18 is connected to a rack bar 19 which meshes with a pinion 20 that is driven through worm gearing 21 by an electric motor 22. The motor 22 is, of course, reversible to effect the necessary reciprocating movements of the coil 13.

The slide 18 also carries the air nozzle 15 from which an air blast issues to blow impurities from between the edges of the pipe skelp so that a clean weld may be effected when the edges are brought together, and to increase heating by intensification of the arc. The air nozzle 15 may be adjustably mounted on the bracket 14, if desired.

In Fig. 3, I show another manner in which an arcing voltage and current may be induced in the pipe skelp at the initial and final stages in a welding operation. By this arrangement, an auxiliary coil 24 is provided in addition to the coils 12a and 13a. When the forward end of the skelp enters between the coils 12a and 13a, the coil 24 is energized temporarily to insure that an arc will be established in as short time as possible. After an arc has been established at the forward end of a pipe skelp, the circuit of the coil 24 may be broken and the welding operation continued simply by the use of coils 12a and 13a which are in relatively fixed positions.

The provision in Figs. 1 to 3 of means for concentrating the secondary circuit at the beginning and ending of a welding operation results in less loss of pipe material since the extremities of the pipe skelp will be welded instead of portions thereof being left unwelded as would happen if the ends of the pipe were moved past the coils before they became sufficiently heated. The coils 12a, 13a and 24 may be excited from a given source of alternating current or independently of one another and in varying degrees.

The air jet at 15 may, in addition to being employed as a means for blowing slag and surplus metal away from the seam, be also used to counteract the blowing or repulsive action of the coil 12, if an inner coil 13 is not employed, when such blowing or repulsive action excessively tends to expel molten metal from between the edges of the skelp.

In Fig. 4, I show an outer coil 12b and an inner coil 13b, the inner coil having a greater number of ampere turns than does the coil 12b, so that a blowing or repulsive action will be produced by the inner coil in excess of a similar action produced by the coil 12b, thus causing the expulsion from between the edges of the skelp of excessive molten metal, slag and other impurities, or to overcome the action of gravity, whereby the molten metal would tend to flow toward the interior of the pipe skelp.

Referring now to Figs. 5 and 6, I show means for initially spreading the edges of the skelp, it being desirable to have such edges moved apart somewhat from contacting engagement at the beginning of a welding operation, to facilitate the forming of an arc across said edges, in order to cause preliminary heating of the edges of the skelp. To this end, I move an expanding device into position at the forward end of the skelp preliminary to the beginning of a welding operation. This device consists of a non-magnetic block 26 which may be mounted on a suitable carriage, if desired. The block carries at its lower end a pin or stud 27 that extends into the pipe skelp, and holds it down against upward pressure which may be exerted by insulated cams 28 that extend into the skelp. The cams 28 are secured to shafts 29 that are journalled in the block 26 and carry gear wheels 31 at their outer ends. A pinion 32 is disposed between and meshes with the gear wheels 31 and has connection with a crank arm 33 that is operated by the armature 34 of a solenoid 35.

When the block 26 is moved to the position shown in Fig. 6, the solenoid 35 is operated to effect slight rotative movement of the gear wheels 31, to thereby turn the raised surfaces of the cams 27 into engagement with the inner wall of the pipe skelp and spread such skelp slightly to move the contacting edges apart and thereby draw an arc across the edges of the skelp.

De-energization of the solenoid 35 permits the skelp to assume its full-line position (Fig. 5) with the edges thereof in contact, the induced current flow thereacross completing the weld as heretofore described. When the arc has been established, the block 26 is removed and the pipe skelp caused to travel past the coil since after an arc is formed it can be readily maintained between the edges of the skelp in advance of the welded portion thereof.

In Fig. 7, I show a modification of the structure of Figs. 5 and 6, wherein an expanding device is positioned internally of the pipe skelp in order to permit uninterrupted travel of the skelp past the primary coils to effect a welding operation. In this arrangement, the expanding device comprises a suitable non-magnetic frame or carriage 37 which is provided with rollers 38 that engage the lower inside wall of the pipe skelp, to permit relative traveling movement of the skelp and the expanding device. A pair of insulated rollers 39 are slidably supported at the upper end of the frame 37, in position to engage the upper inner wall of the pipe skelp at points adjacent to the edges of the skelp.

Each roller 39 is mounted on the outer end of a yoked arm 40 which is slidably supported in a guideway 41 of the frame 37. The inner end of the arm 40 engages a cam disc 42 which is mounted on a shaft or rod 43 to which the frame 37 is secured, the shaft 43 being suitably secured to the bracket 14, or being extended longitudinally of the pipe skelp and secured at the rear thereof after the manner of a mandrel bar. The cam disc 42 is rotatable on the shaft 43, and has link connection with an armature 44 which is actuated by a solenoid 45.

When the solenoid 45 is energized, the cam disc 42 is turned sufficiently to cause the cam surfaces of the disc to move the arms 40 and the rollers 39 radially outwardly, thereby spreading the skelp slightly to move the contacting edges apart and thereby draw an arc across the same. Deenergization of the solenoid 45 permits movement of the edges of the skelp into contacting engagement, to complete the welding thereof by the flow of induced current. The solenoid 45 will, of course, be energized in timed relation to the movement of the skelp past the primary coils, so that the arcing across the edges thereof will be established quickly, thereby assuring welding at the forward end of the skelp during its uninterrupted travel past the primary coils.

A further advantage of this structure resides in a more complete control of the arcing across the edges of the skelp; since, if desired, an expanding device may be positioned in advance of the primary induction coils and utilized to spread the edges of the skelp as it is being advanced into welding position, thereby maintaining the edges of the skelp in a predetermined converging relation. Thus, the angle of convergence may be located at the desired position within the zone of the secondary circuit, to permit more or less arcing between the edges of the skelp relative to the rate of travel of the skelp past the primary coils. The use of the spreader bar can be, therefore, readily eliminated, and the internal induction coil supported on the carriage frame 37.

In Figs. 8 and 9, I show a structure wherein yokes 50 and 51, preferably of laminations of electrical sheet steel, to produce a physical magnetic circuit, linking the primary electric circuit in the coils and the secondary electrical circuit in the material being welded. The magnetic path is therefore of less reluctance than if these yokes were not provided permitting the use of alternating current of a somewhat lower frequency. For example, the primary circuit may be energized from a source of alternating current having a frequency of the order of 900 to 1200 cycles. By the use of the yokes to produce a physical magnetic circuit, however, the frequency of the exciting current may be appreciably lowered to accomplish similar welding results. Low frequency current, for example, down to commercial 60 cycle current may be utilized when a physical magnetic circuit is provided. The magnetic flux paths are approximately perpendicular to the surface of the material being welded, the general directions of the lines of flux being approximately perpendicular to the same. There is therefore more effective welding from the use of a given amount of current.

The coils are preferably kept as close as possible to the pipe and the line of the seam by having them curved to approximately the curvature of the pipe skelp so as to more closely restrict the resultant zone of induced current flow or secondary circuit, in the pipe skelp with consequent lessening in loss of energy by heat conduction, and decreasing in magnetic leakage. This induced current flow, it will be seen is in a direction generally parallel to and across the seam line of the pipe. Furthermore, by having the coils located adjacent to the line of weld instead of having them disposed circumferentially of the pipe skelp, there will be no induced current flow around the pipe skelp opposite the weld. Any tendency for the induced current flow around from one side of the pipe will be opposed by the induced lines of current flow at the other side of the pipe, in the opposite direction, because of the magnetic repulsion between the two sides of the circuit.

I claim as my invention:—

1. The method of uniting the edges of metal members, which comprises inducing current flow across the edges of said members by an alternating current coil disposed at one side of said members and causing relative traveling movement of the coil and the said members, and supplementing the current flow induced by the first-named coil by a second coil disposed at the opposite side of the said members, the second coil being positioned in such radially offset but overlapping relation to the first coil at the beginning of the welding operation as will effect concentration of the induced current flow in the said members, softening the metal of the said edges, and thereafter moving the second-named coil to such position relative to the first-named coil as to lengthen the circuit of induced current.

2. Welding apparatus comprising a pair of induction coils axially spaced apart to permit movement of members to be welded between the same, and means for moving said coils relative to one another, in directions parallel to the line of weld.

3. Welding apparatus comprising a pair of induction coils axially spaced apart to permit movement of members to be welded between the same, and means for moving said coils relative to one another, during movement of said members between the same.

4. The method of electric welding which comprises inducing a current flow in the members to be welded, by means of axially-spaced coils that are energized from a source of alternating current, imparting relative traveling movement to said members with respect to the coils, and relatively moving said coils into axially offset relation in radial directions, but maintaining them in overlapping relation to effect concentration of the induced current flow in the said members at one stage of the welding operation, and positioning the said coils in approximately axial alignment at another stage of the welding operation.

5. The method of electric welding which comprises inducing current flow across the members to be welded, from a given source, supplementing said induced current flow from another source, effecting traveling movement of the material relative to said sources, and varying the positions of said sources relative to one another, in directions longitudinally of the line of weld, to vary the intensity of the induced current at a given point along the line of weld.

6. Welding apparatus comprising a pair of induction coils axially-spaced apart to permit movement between the same of members to be welded, the said coils being mounted for relative adjustment in directions parallel to the line of weld.

In testimony whereof I, the said DORAF W. BLAKESLEE have hereunto set my hand.

DORAF W. BLAKESLEE.